(12) United States Patent
Yu et al.

(10) Patent No.: US 11,916,395 B2
(45) Date of Patent: Feb. 27, 2024

(54) METHOD, APPARATUS, AND SYSTEM FOR MONITORING ISLANDING ELECTRICITY GENERATION UNIT

(71) Applicant: BEIJING GOLDWIND SCIENCE & CREATION WINDPOWER EQUIPMENT CO., LTD., Beijing (CN)

(72) Inventors: Lianfu Yu, Beijing (CN); Xianwen Bao, Beijing (CN); Xiaogang Xing, Beijing (CN); Yanlu Liu, Beijing (CN); Meiling Zuo, Beijing (CN)

(73) Assignee: BEIJING GOLDWIND SCIENCE & CREATION WINDPOWER EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 18/000,929

(22) PCT Filed: Sep. 7, 2020

(86) PCT No.: PCT/CN2020/113736
§ 371 (c)(1),
(2) Date: Dec. 6, 2022

(87) PCT Pub. No.: WO2021/258547
PCT Pub. Date: Dec. 30, 2021

(65) Prior Publication Data
US 2023/0223762 A1  Jul. 13, 2023

(30) Foreign Application Priority Data
Jun. 22, 2020 (CN) .......................... 202010574010.1

(51) Int. Cl.
*H02J 3/38* (2006.01)
*H02J 13/00* (2006.01)
*H02J 3/46* (2006.01)

(52) U.S. Cl.
CPC .............. *H02J 3/388* (2020.01); *H02J 3/381* (2013.01); *H02J 3/46* (2013.01);
(Continued)

(58) Field of Classification Search
CPC ........ H02J 3/38; H02J 3/388; H02J 13/00036; H02J 13/00002; H02J 3/381; H02J 3/46; H02J 2300/28; H02J 2300/24; H02J 13/00

See application file for complete search history.

(56) References Cited

FOREIGN PATENT DOCUMENTS

| CN | 102355002 A | 2/2012 |
|---|---|---|
| CN | 206775117 U | 12/2017 |

(Continued)

OTHER PUBLICATIONS

International Search Report in related PCT Application No. PCT/CN2020/113736 dated Mar. 22, 2021 (9 pages).

*Primary Examiner* — Robert L Deberadinis
(74) *Attorney, Agent, or Firm* — Bayes PLLC

(57) ABSTRACT

A method, an apparatus, and a system for monitoring an islanding electricity generation unit are provided. The method includes determining an islanding electricity generation unit in a renewable energy station on the basis of collected electrical capacity at critical electrical nodes of the renewable energy station, and controlling a switch device corresponding to the determined islanding electricity generation unit to sever connection between the electricity generation unit and a collector line. The critical electrical nodes include nodes that have a collecting effect on grid-connected current of the electricity generation units of the (Continued)

renewable energy station, and each collector line being constructed to collect grid-connected current from at least one electricity generation unit and input same into a main transformer of the renewable energy station.

20 Claims, 4 Drawing Sheets

(52) U.S. Cl.
CPC .. *H02J 13/00002* (2020.01); *H02J 13/00036* (2020.01); *H02J 2300/24* (2020.01); *H02J 2300/28* (2020.01)

(56) References Cited

FOREIGN PATENT DOCUMENTS

| | | | |
|---|---|---|---|
| CN | 207117195 U | | 3/2018 |
| CN | 111245003 A | * | 6/2020 |
| CN | 111245003 A | | 6/2020 |
| EP | 1278282 A1 | | 1/2003 |

* cited by examiner

METHOD, APPARATUS, AND SYSTEM FOR MONITORING ISLANDING ELECTRICITY GENERATION UNIT

CROSS-REFERENCE TO RELATED APPLICATIONS

This application is the national phase of International Application No. PCT/CN2020/113736, filed on Sep. 7, 2020, which claims the priority to Chinese Patent Application No. 202010574010.1, filed on Jun. 22, 2020. The entire contents of each of the above-identified applications are expressly incorporated herein by reference.

TECHNICAL FIELD

The present disclosure generally relates to the field of energy technology, particularly to a method, an apparatus and a system for monitoring a generator unit in islanded operation.

BACKGROUND

The wind power penetration in China is increasing year by year. As the installed capacity for wind power is increasing, the level of participation of wind power in the overall control and regulation of the power grid is increasing as well. When a wind power plant operates normally, scheduled or unscheduled shutdowns (fault or temporary shutdown) may occur. In a process of a scheduled shutdown, the wind power plant may first shut down wind turbines on each corresponding collecting line one by one, and then turn off a breaker of the whole collecting line so as to realize a power outage of the entire line. When the breakers of all collecting lines on the low-voltage side of the main transformer are all turned off, the breaker on the low-voltage side of the main transformer is then turned off. In a similar fashion, the breakers in the power plant may be operated from bottom to top according to the scope of the power outage. Such operation does not adversely affect the equipment, especially for the wind turbines. However, in the event of a failure or some other temporary emergency shutdown, it is hard to perform a power outage in such sequence. A certain collecting line or the breakers on the high-voltage side and the low-voltage side of the main transformer may trip directly, causing the collecting line or the wind power plant to be disconnected from the entire grid, or in other words, to be cut out. In this case, a wind turbine is supposed to shut down immediately due to lack of the grid-side support of the large power grid. However, in some special cases, despite the lack of support from the large power grid, a wind turbine may operate in an islanded state within the plant. The island may be a wind turbine on one collecting line, or may be wind turbines on multiple collection lines in the plant. When an island is formed, a grid-connected wind turbine (that is, a wind turbine which outputs active power to a collecting line), a grid-disconnected wind turbine (that is, a wind turbine which is unable to output active power to a collecting line) and other loads within the plant reach a balance in terms of the output and usage of active power. The grid-disconnected wind turbine will not shut down immediately, but continue grid-connected operation for seconds or even minutes, during which an islanded system is formed. However, due to the lack of support from the power grid, the islanded system may have highly unstable voltage and frequency, which may lead to hazardous operating conditions such as high voltage and excessive harmonics and thereby cause damage to components of the wind turbine, or even cause damage to large devices in the wind power plant, bringing huge economic losses to the wind power plant.

Due to the particularity of wind power generation, the wind turbines in a wind power plant may have characteristics of decentralized distribution in a large area in terms of spatial distribution and electrical connection, which leads to the possibility of the wind turbines and the large power grid operating separately during the operation of the wind power plant due to system failure or operations from the wind power plant. Ideally, the wind turbine will shut down quickly after losing the support from the large grid; however, in some special instances, for example, when a collecting line in the wind power plant is out of power, the active power output of the grid-connected wind turbine and the load within the system reach a short-term balance. In this case, the wind turbine is unable to determine in time that it has lost the support from the large power grid and continues operating for seconds or even longer. During this period, due to the instability of the system voltage and frequency, it is easy to cause damage to components of the wind turbine and thereby bring huge economic losses to the wind turbine and the wind power plant.

Exemplary embodiments of the present disclosure are to provide a method, an apparatus, and a system for monitoring for a generator unit in islanded operation, which solve the problem that a generator unit cannot shut down in time and quickly after islanded.

According to an exemplary embodiment of the present disclosure, a method for monitoring for a generator unit in islanded operation is provided. The method includes: determining a generator unit in islanded operation in a renewable energy station based on an electrical quantity acquired at a key electrical node of the renewable energy station; controlling a switching device corresponding to the determined generator unit in islanded operation to disconnect the generator unit from a collecting line, where the key electrical node includes a node which serves to combine grid-connected currents of generator units in the renewable energy station, and each collecting line is configured to combine a grid-connected current of at least one generator unit and input the combined grid-connected current to a main transformer in the renewable energy station.

According to another exemplary embodiment of the present disclosure, a system for monitoring for a generator unit in islanded operation is provided. The system includes: at least one electrical quantity acquisition terminal, each electrical quantity acquisition terminal being configured to acquire an electrical quantity at a corresponding key electrical node; multiple switching devices, each switching device being configured to disconnect the corresponding generator unit from a collecting line or connect the corresponding generator unit to the collecting line; and a centralized controller configured to perform the method for monitoring for a generator unit in islanded operation as described above.

According to an exemplary embodiment of the present disclosure, an apparatus for monitoring for a generator unit in islanded operation is provided. The apparatus includes: an determination unit configured to determine a generator unit in islanded operation in a renewable energy station based on an electrical quantity acquired at a key electrical node of the renewable energy station; a control unit configured to control a switching device corresponding to the determined generator unit in islanded operation to disconnect the generator unit from a collecting line, where the key electrical node includes a node which serves to combine grid-connected currents of generator units in the renewable energy station, and each collecting line is configured to combine a grid-connected current of at least one generator unit and input the combined grid-connected current to a main transformer in the renewable energy station.

The method, apparatus, and system for monitoring for a generator unit in islanded operation according to exemplary embodiments of the present disclosure are able to quickly and effectively monitor for a generator unit in islanded operation and disconnect the generator unit in islanded operation from a collecting line, so as to terminate a grid-connected operation status of the generator unit in islanded operation, realizing a rapid protection of the generator unit within a short time once the generator unit is islanded. In terms of the overall control of the station, the loss caused by islanded operation of a generator unit after losing support from the power grid can be avoided.

A part of additional aspects and/or advantages of the general concepts of the present disclosure is illustrated in the following description. Other aspects and/or advantages may be apparent from the description, or may be learned from implementation of the present disclosure.

BRIEF DESCRIPTION OF DRAWINGS

The above and other aspects and features of the present disclosure will become more apparent from the description in conjunction with the drawings showing the exemplary embodiment, in which.

DETAILED DESCRIPTION

Figure 1:
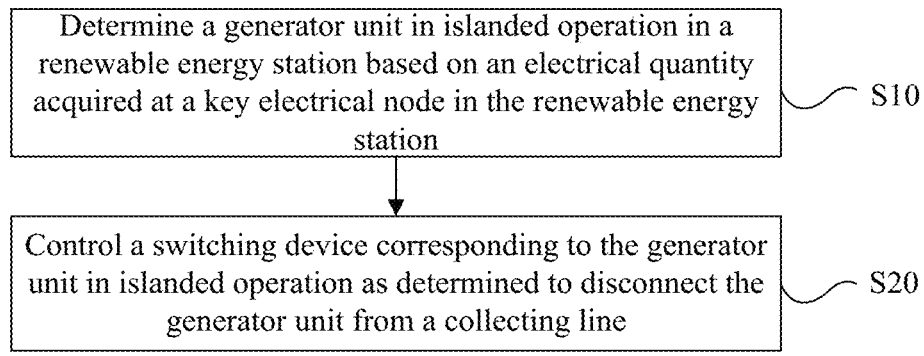
FIG. 1 shows a flowchart of a method for monitoring for a generator unit in islanded operation according to an exemplary embodiment of the present disclosure.

Reference is made is detail to embodiments of the present disclosure. Examples of the embodiments are illustrated in the drawings, where same reference numerals represent same components. The embodiments are illustrated hereinafter with reference to the drawings to explain the present disclosure.

FIG. 1 shows a flowchart of a method for monitoring for a generator unit in islanded operation according to an exemplary embodiment of the present disclosure.

With reference to FIG. 1, in step S10, a generator unit in islanded operation in a renewable energy station is determined based on an electrical quantity acquired at a key electrical node in the renewable energy station.

Here, the key electrical node includes a node that serves to combine grid-connected currents of generator units of the renewable energy station. The key electrical node may be an electrical node the electrical quantity at which can be used to determine whether a generator unit downstream thereof is in an islanded state. Here, it is defined that a power grid is upstream of a power generator unit, and the generator unit is downstream of the power grid.

The term "islanded operation" refers to a state where part of the power grid containing a load and a power supply continues to operate in isolation after being detached from the main grid. For example, for a wind power plant, "islanded operation" particularly refers to a state where one or multiple wind turbines form an independent local power grid and maintain continuous operation rather than shutting down after losing support from the large power grid.

As an example, the key electrical node may include an electrical node located at each entrance where a collecting line in the renewable energy station is connected to a low-voltage side bus of a main transformer in the renewable energy station. In addition, as an example, the key electrical node may further include at least one of: an electrical node between a high-voltage side and a high-voltage side bus of the main transformer in the renewable energy station, an electrical node between a low-voltage side and the low-voltage side bus of the main transformer in the renewable energy station, and an electrical node between a grid-connected point of the renewable energy station and the high-voltage side bus of the main transformer. It should be understood that the renewable energy station may include at least one main transformer.

Here, each collecting line is configured to combine a grid-connected current of at least one generator unit and input the combined grid-connected current to the main transformer in the renewable energy station. In other words, grid-connected currents of the generator units are combined by corresponding collecting lines so as to be inputted to the main transformer (for example, the low-voltage side bus of the main transformer) in the renewable energy station.

As an example, each collecting line may be provided with a single key electrical node. Specifically, the key electrical node is provided on the collecting line at a position which is upstream of all of the generator units whose grid-connected current are combined so as to be inputted to the low-voltage side bus of the main transformer through the collecting line, and downstream of the low-voltage side bus of the main transformer.

As an example, the renewable energy station may be a wind power plant or a photovoltaic station. It should be understood that the renewable energy station may be of other types. As an example, the generator unit may be a wind turbine or a photovoltaic module. It should be understood that the generator unit may be other types of renewable energy generation devices.

Figure 2:
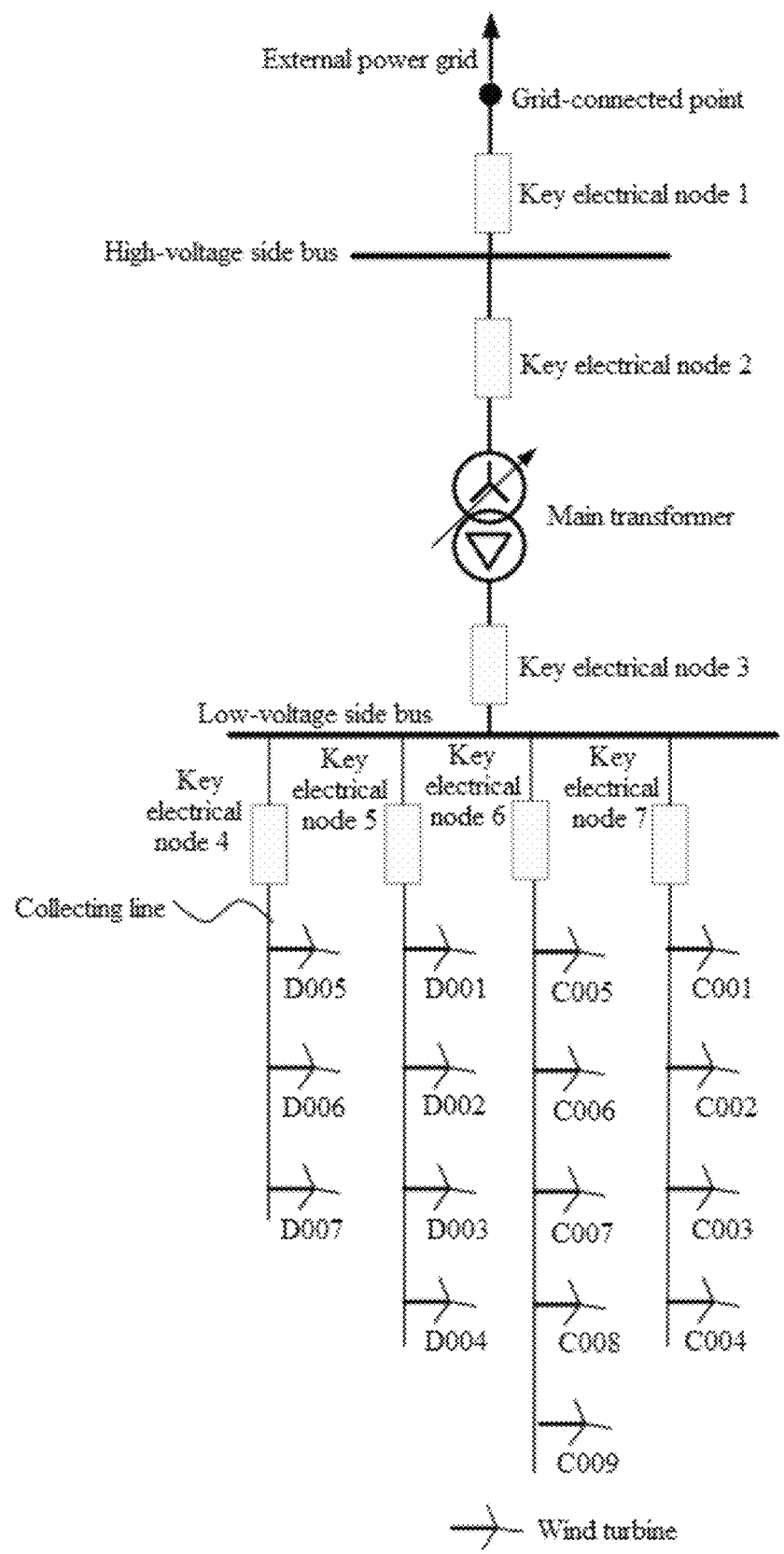
FIG. 2 shows a schematic diagram of the distribution of key electrical nodes according to an exemplary embodiment of the present disclosure.

As shown in FIG. 2, the renewable energy station is a wind power plant, and the generator unit is a wind turbine. In the wind power plant shown in FIG. 2, the key electrical node located at each entrance where a collecting line in the renewable energy station is connected to the low-voltage side bus of the main transformer includes: key electrical nodes 4, 5, 6, and 7; the key electrical node between the high-voltage side and the high-voltage side bus of the main transformer in the wind power plant is key electrical node 2; the key electrical node between the low-voltage side and the low-voltage side bus of the main transformer in the wind power plant is key electrical node 3; and the key electrical node between the grid-connected point of the wind power plant and the high-voltage side bus of the main transformer is key electrical node 1. It should be understood that FIG. 2 only shows the case where the wind power plant includes one main transformer, while in practice, the wind power plant may include multiple main transformers.

In step S20, a switching device corresponding to the generator unit in islanded operation as determined is controlled to disconnect the islanding generator unit from a collecting line. In this way, the generator unit in islanded operation is stopped from outputting active power to the collecting line or obtaining active power from the collecting line, that is, the generator unit in islanded operation is disconnected from a power system.

As an example, the switching device may be a switching device that is able to receive control commands and perform breaking. For example, the switching device may be a knife switch, a breaker or the like, which is not limited herein.

As an example, the switching device corresponding to the generator unit may be provided between a low-voltage side of a box-type transformer and a grid side of a converter in the generator unit.

As an example, the switching device may be a grid-connected switch at the side of the corresponding generator unit. For example, the switching device may be an existing grid-connected switch, such as a breaker at the low-voltage side of the box-type transformer in the generator unit, or a grid side switch of an internal converter of the generator unit, or may be an additional switching device.

As an example, a turn-off control command (for example, a tripping control command) may be transmitted to the switching device corresponding to the determined generator unit in islanded operation through a fast communications channel, to control the switching device to switch off. For example, the communications channel may be a communications channel based on one of the communications protocols of OPC UA, UDP, TCP/IP, Profinet, and EtherCAT, or may be a dedicated communications channel developed based on the link layer or other communications protocol layers, which is not limited herein. For example, the communications channel may be a dedicated communications channel.

It should be understood that the electrical quantity acquired at the key electrical node of the renewable energy station may be an electrical quantity directly measured by a measuring device (for example, a sensor), or an electrical quantity indirectly obtained by calculation based on the measured electrical quantity.

As an example, the electrical quantity acquired at the key electrical node in the renewable energy station may be an electrical quantity that may be used to determine whether a generator unit is in an islanded operation state. As an example, the electrical quantity at the key electrical node may include at least one of: voltage, current, active power, reactive power, apparent power, power factor, voltage or current frequency, active power change rate, reactive power change rate, voltage or current frequency change rate, current change rate, voltage change rate, and apparent power change rate. It should be understood that the electrical quantity may include other types of electrical quantities.

As an example, for each key electrical node, when the value of the electrical quantity at the key electrical node meets a corresponding preset condition, any generator unit whose corresponding switching device is closed is determined, from all generator units that are connected to the power grid via the key electrical node (that is, all generator units that are downstream of the key electrical node), as being in an islanded state. In other words, by checking on-off states of switching devices corresponding to the generator units connected to the power grid via the key electrical node, the generator unit in islanded operation is accurately determined, and a turn-off control command is sent to the switching device corresponding to the generator unit in islanded operation. Here, once the switching device corresponding to the generator unit is turned off, the generator unit is disconnected from the collecting line.

It should be understood that each electrical quantity may be provided with a corresponding threshold range, and whether a value of the electrical quantity at the key electrical node meets the corresponding preset condition is determined depending on the determination of whether the value exceeds the corresponding threshold range. For example, it can be determined whether a current value at a key electrical node is lower than a preset current threshold, and if so, the current value meets the preset condition. It should be understood that, if multiple electrical quantities are acquired, a generator unit whose corresponding switching device is closed among all generator units that are connected to the power grid via the key electrical node is determined as being in an islanded state when values of the multiple electrical quantities at the key electrical node all meet their respective preset conditions.

With reference to FIG. 2, all key electrical nodes (that is, the corresponding key electrical nodes) through which wind turbines are connected to the power grid are shown in Table 1. In other words, all generator units that are connected to the power grid through corresponding key electrical nodes can be learned from Table 1. For example, generator units that are connected to the power grid through key electrical node 4 include wind turbines D005, D006 and D007; and generator units that are connected to the power grid through key electrical nodes 1 to 3 include wind turbines D001 to D007 and wind turbines C001 to C009.

TABLE 1

Correspondence between Generator Units and Key Electrical Nodes

| Identifier information of wind turbines | Identifier information of corresponding key electrical nodes |
|---|---|
| D005, D006, D007 | key electrical nodes 1, 2, 3 and 4 |
| D001, D002, D003, D004 | key electrical nodes 1, 2, 3 and 5 |
| C005, C006, C007, C008, C009 | key electrical nodes 1, 2, 3 and 6 |
| C001, C002, C003, C004 | key electrical nodes 1, 2, 3 and 7 |

In addition, the method for monitoring for a generator unit in islanded operation according to an exemplary embodiment of the present disclosure may further include: for each key electrical node, determining an on-off state of a breaker near the key electrical node; and in a case that the breaker near the key electrical node is in a turned-off state, performing step S10 of determining a generator unit in islanded operation based on an electrical quantity acquired at the key electrical node.

As an example, the breaker near the key electrical node may include a breaker closest to the key electrical node. For example, as shown in FIG. 2, breakers near key electrical nodes 4 to 7 may be breakers on corresponding collecting lines; a breaker near key electrical node 3 may be a breaker on the low-voltage side of the main transformer; a breaker near key electrical node 2 may be a breaker on the high-voltage side of the main transformer, and a breaker near the key electrical node 1 may be a breaker at the grid-connected point.

In addition, as an example, the method for monitoring for a generator unit in islanded operation according to an exemplary embodiment of the present disclosure may further include: after step S20, receiving turn-on state information (for example, location information of a contact)

returned by the switching device corresponding to the determined generator unit in islanded operation, to monitor an entire overall control process.

Figure 3:
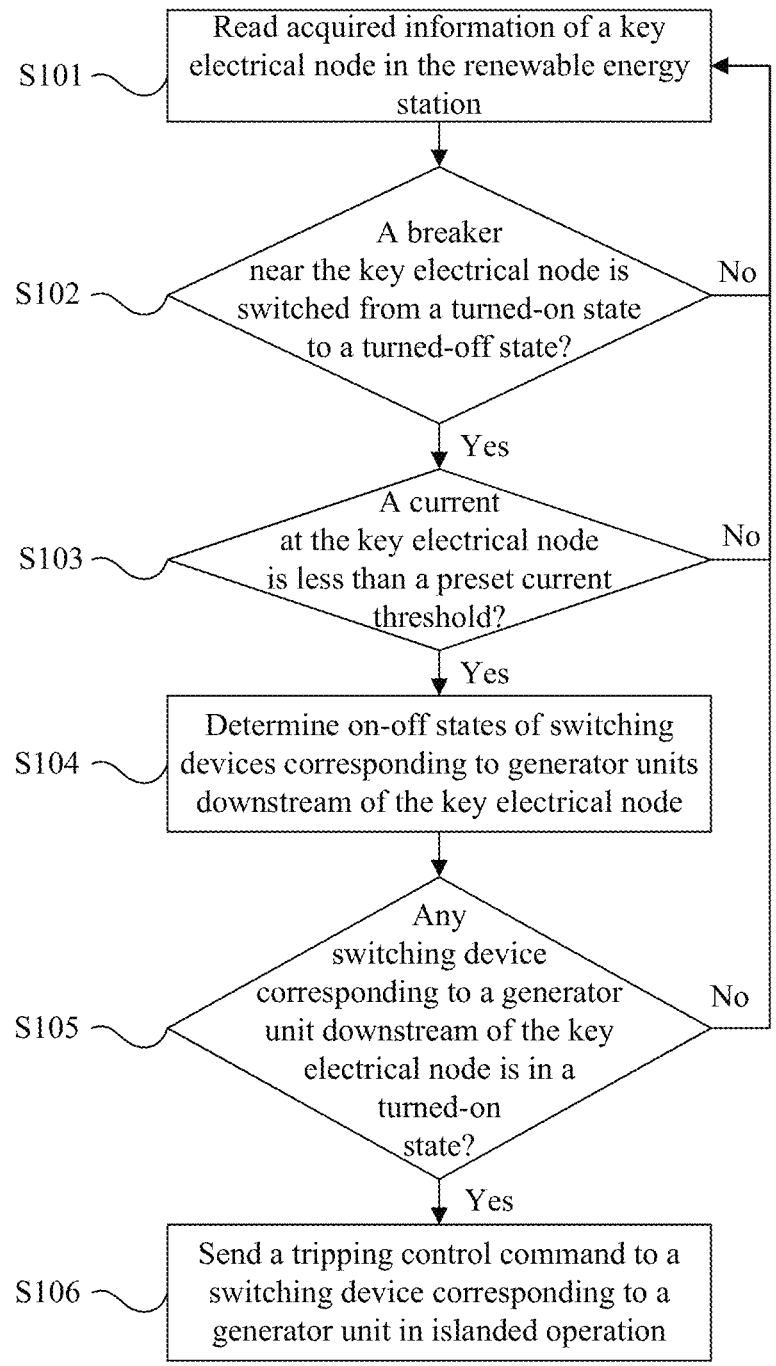
FIG. 3 shows a flowchart of a method for monitoring for a generator unit in islanded operation according to another exemplary embodiment of the present disclosure.

FIG. 3 shows a flowchart of a method for monitoring for a generator unit in islanded operation according to another exemplary embodiment of the present disclosure.

As shown in FIG. 3, in step S101, acquired information of a key electrical node in a renewable energy station is read, where the information of the key electrical node includes an electrical quantity at the key electrical node and on-off state information of a breaker near the key electrical node (for example, location information of a contact).

In step S102, it is determined whether any breaker near the key electrical node is switched from a turned-on state to a turned-off state.

When it is determined in step S102 that a breaker near the key electrical node is switched from a turned-on state to a turned-off state, step S103 is executed, to determine whether a current at the key electrical node is less than a preset current threshold.

If it is determined in step S103 that the current at the key electrical node is less than the preset current threshold, step S104 is executed, to determine on-off states of switching devices corresponding to generator units downstream of the key electrical node.

In step S105, it is determined whether any switching device corresponding to a generator unit downstream of the key electrical node is in a turned-on state, to determine whether there is a generator unit in islanded operation. That is, a generator unit corresponding to a switching device in a turned-on state among switching devices corresponding to generator units downstream of the key electrical node is determined as the generator unit in islanded operation.

When it is determined in step S105 that a switching device corresponding to a generator unit downstream of the key electrical node is in a turned-on state, step S106 is executed, to send a tripping control command to the switching device in a turned-on state among the switching devices corresponding to the generator units downstream of the key electrical node, to disconnect a corresponding generator unit from the power grid.

Figure 4:
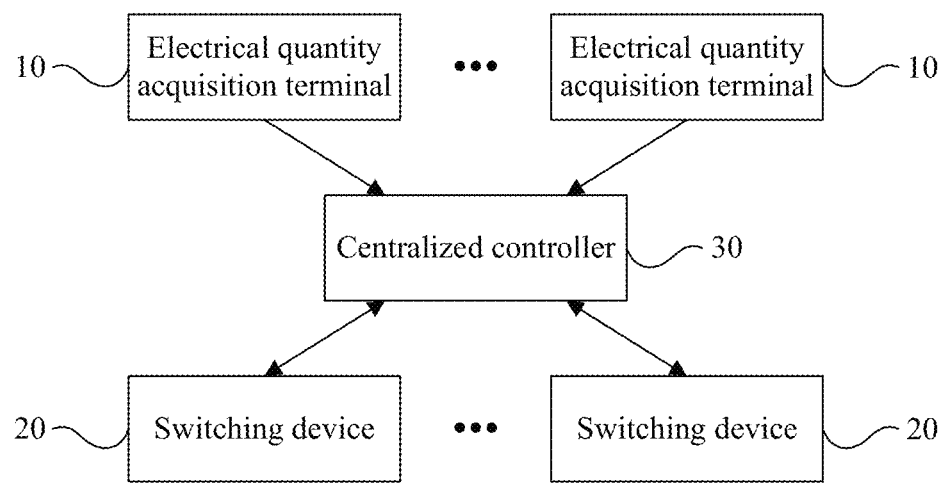
FIG. 4 shows a structural block diagram of a system for monitoring for a generator unit in islanded operation according to an exemplary embodiment of the present disclosure.

FIG. 4 shows a structural block diagram of a system for monitoring for a generator unit in islanded operation according to an exemplary embodiment of the present disclosure.

As shown in FIG. 4, the system for monitoring for a generator unit in islanded operation according to an exemplary embodiment of the present disclosure includes at least one electrical quantity acquisition terminal 10, multiple switching devices 20, and a centralized controller 30. It should be understood that FIG. 4 only shows a case where the system for monitoring for a generator unit in islanded operation includes multiple electrical quantity acquisition terminals 10. The system for monitoring for a generator unit in islanded operation according to an exemplary embodiment of the present disclosure may include only one electrical quantity acquisition terminal 10.

Specifically, each electrical quantity acquisition terminal 10 is configured to acquire an electrical quantity at a corresponding key electrical node. As an example, there may be a one-to-one correspondence between the at least one electrical quantity acquisition terminal 10 and key electrical nodes in a renewable energy station, that is, one electrical quantity acquisition terminal 10 only corresponds to one key electrical node.

Each switching device 20 is configured to disconnect the corresponding generator unit from a collecting line or connect the corresponding generator unit to the collecting line.

Here, there is a one-to-one correspondence between the multiple switching devices 20 and the generator units in the renewable energy station, that is, each switching device 20 is only configured to disconnect one corresponding generator unit from a collecting line or connect one corresponding generator unit to the collecting line.

The centralized controller 30 is configured to perform the following operations: determining a generator unit in islanded operation in the renewable energy station based on the electrical quantity acquired at the key electrical node in the renewable energy station; and controlling a switching device corresponding to the determined generator unit in islanded operation to disconnect the generator unit from a collecting line.

Here, the key electrical node includes a node that serves to combine grid-connected currents of generator units of the renewable energy station. Each collecting line is configured to combine a grid-connected current of at least one generator unit and input the combined grid-connected generator to a main transformer in the renewable energy station.

As an example, the key electrical node may include an electrical node located at each entrance where a collecting line in the renewable energy station is connected to a low-voltage side bus of the main transformer in the renewable energy station. In addition, as an example, the key electrical node may further include at least one of: an electrical node between a high-voltage side and a high-voltage side bus of the main transformer in the renewable energy station, an electrical node between a low-voltage side and the low-voltage side bus of the main transformer in the renewable energy station, and an electrical node between a grid-connected point of the renewable energy station and the high-voltage side bus of the main transformer.

As an example, the electrical quantity at the key electrical node acquired by the electrical quantity acquisition terminal 10 may be an electrical quantity directly measured by a measuring device (for example, a sensor), or an electrical quantity indirectly obtained by calculation based on the measured electrical quantity.

As an example, the electrical quantity at the key electrical node acquired by the electrical quantity acquisition terminal 10 may be an electrical quantity that can be used to determine whether a generator unit is in an islanded operation state. As an example, the electrical quantity at the key electrical node may include at least one of: voltage, current, active power, reactive power, apparent power, power factor, voltage or current frequency, active power change rate, reactive power change rate, voltage or current frequency change rate, current change rate, voltage change rate, and apparent power change rate. It should be understood that the electrical quantity may include other types of electrical quantities.

As an example, the switching device 20 may be a switching device capable of receiving a control command and perform breaking. For example, a quick tripping device of the switching device 20 may quickly trip in response to a tripping control command. For example, the switching device 20 may be a knife switch, a breaker or the like, which is not limited herein.

As an example, the switching device 20 corresponding to the generator unit may be provided between a low-voltage side of a box-type transformer and a grid side of a converter in the generator unit.

As an example, the switching device 20 may be a grid-connected switch at the side of a corresponding generator unit. For example, the switching device 20 may be an existing grid-connected switch, such as a breaker at the low-voltage side of the box-type transformer in the generator unit or a grid side switch of an internal converter of the generator unit, or may be an additional switching device.

As an example, the centralized controller 30 may be configured to performing the following operation: determining, for each key electrical node, a generator unit corresponding to a switching device 20 in a turned-on state, from all generator units that are connected to a power grid via the key electrical node, as being in an islanded state, in a case that a value of an electrical quantity at the key electrical node meets a corresponding preset condition.

Additionally, as an example, the electrical quantity acquisition terminal 10 may further be configured to acquire on-off state information of a breaker near a corresponding key electrical node, and the centralized controller 30 may be configured to perform the following operation: performing the operation of determining a generator unit in islanded operation based on an electrical quantity acquired at the key electrical node in a case that the breaker near the key electrical node is in a turned-off state.

As an example, the centralized controller 30 may include a first communications module and a second communications module. The centralized controller 30 may communicate with the electrical quantity acquisition terminal 10 through the first communications module to obtain an electrical quantity at a corresponding key electrical node acquired by the electrical quantity acquisition terminal 10, and may communicate with the switching device 20 through the second communications module to control the switching device 20 to disconnect the corresponding generator unit from a collecting line. It should be understood that the first communications module and the second communications module may be the same or different communications modules. As an example, the first communications module may be controlled to receive information of a key electrical node reported by the electrical quantity acquisition terminal 10 through a fast communications channel. For example, the communications channel may be a communications channel based on one of the communications protocols of OPC UA, UDP, TCP/IP, Profinet, and EtherCAT, or may be a dedicated communications channel developed based on the link layer or other communications protocol layers, which is not limited herein. For example, the communications channel may be a dedicated communications channel. As an example, the second communications module may be controlled to send a turn-off control command (for example, a tripping control command) to the switching device 20 corresponding to the determined generator unit in islanded operation through a fast communications channel, to control the switching device 20 to switch off. For example, the communications channel may be a communications channel based on one of the communications protocols of OPC UA, UDP, TCP/IP, Profinet, and EtherCAT, or may be a dedicated communications channel developed based on the link layer or other communications protocol layers, which is not limited herein. For example, the communications channel may be a dedicated communications channel.

As an example, the centralized controller 30 may be provided within a substation of the renewable energy station (for example, a wind power plant). The electrical quantity acquisition terminal 10 may be provided near a corresponding key electrical node.

It should be understood that the processing performed by the centralized controller 30 according to the exemplary embodiment of the present disclosure has been described in detail in the description of the method for monitoring for a generator unit in islanded operation according to the exemplary embodiment of the present disclosure with reference to FIG. 1, for which relevant details thereof are not repeated herein.

The system for monitoring a generator unit in islanded operation according to the exemplary embodiment of the present disclosure performs a comprehensive control of generator units from the perspective of an energy station. The system has characteristics of simple system structure, high efficiency and high reliability, and is able to effectively solve the problem of islanding protection of generator units in renewable energy stations, by which generator units are protected from component damages due to islanding issues and operation economy of the generator units is significantly improved.

Figure 5:
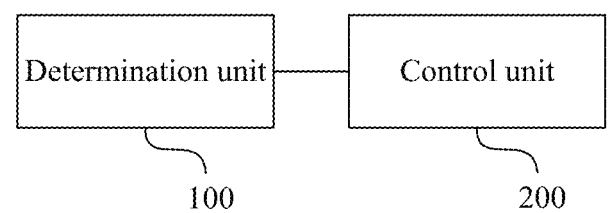
FIG. 5 shows a structural block diagram of an apparatus for monitoring for a generator unit in islanded operation according to an exemplary embodiment of the present disclosure.

FIG. 5 shows a structural block diagram of an apparatus for monitoring for a generator unit in islanded operation according to an exemplary embodiment of the present disclosure.

As shown in FIG. 5, the apparatus for monitoring for a generator unit in islanded operation according to an exemplary embodiment of the present disclosure includes a determination unit 100 and a control unit 200.

Specifically, the determination unit 100 is configured to determine a generator unit in islanded operation in a renewable energy station based on an electrical quantity acquired at a key electrical node of a renewable energy station, where the key electrical node include a node serves to combine grid-connected currents of generator units in the renewable energy station.

The control unit 200 is configured to control a switching device corresponding to the determined generator unit in islanded operation to disconnect the generator unit from a collecting line, where each collecting line is configured to combine a grid-connected current of at least one generator unit and input the combined grid-connected current to a main transformer in the renewable energy station.

As an example, the key electrical node may include an electrical node located at each entrance where a collecting line in the renewable energy station is connected to a low-voltage side bus of the main transformer in the renewable energy station.

As an example, the key electrical node may further include at least one of: an electrical node between a high-voltage side and a high-voltage side bus of the main transformer in the renewable energy station, an electrical node between a low-voltage side and the low-voltage side bus of the main transformer in the renewable energy station, and an electrical node between a grid-connected point of the renewable energy station and the high-voltage side bus of the main transformer.

As an example, the electrical quantity at the key electrical node may include at least one of: voltage, current, active power, reactive power, apparent power, power factor, voltage or current frequency, active power change rate, reactive power change rate, voltage or current frequency change rate, current change rate, voltage change rate, and apparent power change rate.

As an example, the determination unit 100 may determine, for each key electrical node, a generator unit corresponding to a switching device in a turned-on state, from all generator units that are connected to a power grid via the key electrical node, as being in an islanded state, in a case that a value of an electrical quantity at the key electrical node meets a corresponding preset condition.

As an example, the determination unit 100 may determine, for each key electrical node, an on-off state of a breaker near the key electrical node, and determine, in a case that the breaker near the key electrical node is in a turned-off state, a generator unit in islanded operation based on an acquired electrical quantity at the key electrical node.

As an example, the switching device corresponding to the generator unit may be provided between a low-voltage side of a box-type transformer and a grid side of a converter in the generator unit.

As an example, the renewable energy station may be a wind power plant or a photovoltaic station.

As an example, the apparatus for monitoring for a generator unit in islanded operation according to an exemplary embodiment of the present disclosure may be provided in a centralized controller of a wind power plant or a photovoltaic station.

It should be understood that the processing performed by the apparatus for monitoring for a power generator unit in islanded operation according to an exemplary embodiment of the present disclosure has been described in detail with reference to FIGS. 1 to 3, and relevant details thereof are not repeated hereinafter.

It is to be understood that various units in the apparatus for monitoring for a generator unit in islanded operation according to the exemplary embodiments of the present disclosure may be implemented as hardware components and/or software components. Those skilled in the art may implement the various apparatus based on the defined processing to be performed by each apparatus using a field programmable gate array (FPGA) or an application specific integrated circuit (ASIC), for example.

A computer-readable storage medium having a computer program stored thereon is provided according to an exemplary embodiment of the present disclosure. The computer program is executed by a processor, to perform the method for monitoring for a generator unit in islanded operation according to the above exemplary embodiments. The computer-readable storage medium may be any data storage apparatus capable of storing data that is readable by a computer system. Examples of the computer-readable storage medium include: a read only memory, a random access memory, a read only optical disc, a magnetic tape, a floppy disk, an optical data storage device, and a carrier wave (such as data transmission through the Internet via a wired or wireless transmission path).

A controller for monitoring a generator unit in islanded operation according to an exemplary embodiment of the present disclosure includes a processor (not shown) and a memory (not shown) having a computer program stored thereon. The computer program is executed by the processor, to perform the method for monitoring for a generator unit in islanded operation according to the above exemplary embodiments.

Although the present disclosure has been illustrated and described with reference to some exemplary embodiments thereof, it should be understood by those skilled in the art that various modifications may be made to the embodiments without departing from the spirit and scope of the present disclosure as defined in the appended claims and equivalents thereof.

The invention claimed is:

1. A method for monitoring for a generator unit in islanded operation, the method comprising:
   determining a generator unit in islanded operation in a renewable energy station based on an electrical quantity acquired at a key electrical node in the renewable energy station; and
   controlling a switching device corresponding to the determined generator unit in islanded operation to disconnect the generator unit from a collecting line,
   wherein the key electrical node comprises a node that serves to combine grid-connected currents of generator units in the renewable energy station, and
   each collecting line is configured to combine a grid-connected current of at least one generator unit and input the combined grid-connected current to a main transformer in the renewable energy station.

2. The method according to claim 1, wherein the key electrical node comprises an electrical node located at each entrance where a collecting line in the renewable energy station is connected to a low-voltage side bus of the main transformer in the renewable energy station.

3. The method according to claim 2, wherein the key electrical node further comprises at least one of:
   an electrical node between a high-voltage side of the main transformer and a high-voltage side bus of the main transformer in the renewable energy station,
   an electrical node between a low-voltage side of the main transformer and the low-voltage side bus of the main transformer in the renewable energy station, and
   an electrical node between a grid-connected point of the renewable energy station and the high-voltage side bus of the main transformer.

4. The method according to claim 1, wherein the electrical quantity at the key electrical node comprises at least one of: voltage, current, active power, reactive power, apparent power, power factor, voltage or current frequency, active power change rate, reactive power change rate, voltage or current frequency change rate, current change rate, voltage change rate, and apparent power change rate.

5. The method according to claim 1, wherein the step of determining the generator unit in islanded operation in the renewable energy station based on the electrical quantity acquired at the key electrical node in the renewable energy station comprises:
   determining, for each key electrical node, a generator unit corresponding to a switching device in a turned-on state, from all generator units that are connected to a power grid via the key electrical node, as being in an islanded state, in a case that a value of an electrical quantity at the key electrical node meets a corresponding preset condition.

6. The method according to claim 1, further comprising:
   determining, for each key electrical node, an on-off state of a breaker near the key electrical node, wherein
   the step of determining the generator unit in islanded operation based on the electrical quantity acquired at the key electrical node is performed in a case that the breaker near the key electrical node is in a turned-off state.

7. The method according to claim 1, wherein the switching device corresponding to a generator unit is provided between a low-voltage side of a box-type transformer and a grid side of a converter in the generator unit.

8. The method according to claim 1, wherein the renewable energy station is a wind power plant or a photovoltaic station.

9. A system for monitoring for a generator unit in islanded operation, the system comprising:
   at least one electrical quantity acquisition terminal, each of the at least one electrical quantity acquisition terminal configured to acquire an electrical quantity at a corresponding key electrical node;

a plurality of switching devices, each of the plurality of switching devices configured to disconnect a corresponding generator unit from a collecting line or connect the corresponding generator unit to the collecting line; and a centralized controller configured to perform the method for monitoring for a generator unit in islanded operation according to claim 1.

10. The system according to claim 9, wherein the key electrical node comprises an electrical node located at each entrance where a collecting line in the renewable energy station is connected to a low-voltage side bus of the main transformer in the renewable energy station.

11. The system according to claim 10, wherein the key electrical node further comprises at least one of:

an electrical node between a high-voltage side of the main transformer and a high-voltage side bus of the main transformer in the renewable energy station, an electrical node between a low-voltage side of the main transformer and the low-voltage side bus of the main transformer in the renewable energy station, and an electrical node between a grid-connected point of the renewable energy station and the high-voltage side bus of the main transformer.

12. The system according to claim 9, wherein the electrical quantity at the key electrical node comprises at least one of: voltage, current, active power, reactive power, apparent power, power factor, voltage or current frequency, active power change rate, reactive power change rate, voltage or current frequency change rate, current change rate, voltage change rate, and apparent power change rate.

13. The system according to claim 9, wherein the step of determining the generator unit in islanded operation in the renewable energy station based on the electrical quantity acquired at the key electrical node in the renewable energy station comprises:

determining, for each key electrical node, a generator unit corresponding to a switching device in a turned-on state, from all generator units that are connected to a power grid via the key electrical node, as being in an islanded state, in a case that a value of an electrical quantity at the key electrical node meets a corresponding preset condition.

14. An apparatus for monitoring a generator unit in islanded operation, the apparatus comprising:

a determination unit configured to determine a generator unit in islanded operation in a renewable energy station based on an electrical quantity acquired at a key electrical node in the renewable energy station; and a control unit configured to control a switching device corresponding to the determined generator unit in islanded operation to disconnect the generator unit from a collecting line, wherein the key electrical node comprises a node that serves to combine grid-connected currents of generator units in the renewable energy station, and each collecting line is configured to combine a grid-connected current of at least one generator unit and input the combined grid-connected current to a main transformer in the renewable energy station.

15. The apparatus according to claim 14, wherein the key electrical node comprises an electrical node located at each entrance where a collecting line in the renewable energy station is connected to a low-voltage side bus of the main transformer in the renewable energy station.

16. The apparatus according to claim 15, wherein the key electrical node further comprises at least one of:

an electrical node between a high-voltage side of the main transformer and a high-voltage side bus of the main transformer in the renewable energy station, an electrical node between a low-voltage side of the main transformer and the low-voltage side bus of the main transformer in the renewable energy station, and an electrical node between a grid-connected point of the renewable energy station and the high-voltage side bus of the main transformer.

17. The apparatus according to claim 16, wherein the electrical quantity at the key electrical node comprises at least one of: voltage, current, active power, reactive power, apparent power, power factor, voltage or current frequency, active power change rate, reactive power change rate, voltage or current frequency change rate, current change rate, voltage change rate, and apparent power change rate.

18. The apparatus according to claim 15, wherein the electrical quantity at the key electrical node comprises at least one of: voltage, current, active power, reactive power, apparent power, power factor, voltage or current frequency, active power change rate, reactive power change rate, voltage or current frequency change rate, current change rate, voltage change rate, and apparent power change rate.

19. The apparatus according to claim 14, wherein the electrical quantity at the key electrical node comprises at least one of: voltage, current, active power, reactive power, apparent power, power factor, voltage or current frequency, active power change rate, reactive power change rate, voltage or current frequency change rate, current change rate, voltage change rate, and apparent power change rate.

20. The apparatus according to claim 14, wherein the apparatus is provided in a centralized controller of a wind power plant or a photovoltaic station.

* * * * *